United States Patent [19]
Cesaroni et al.

[11] Patent Number: 6,162,317
[45] Date of Patent: Dec. 19, 2000

[54] HEAT EXCHANGER TUBING WITH YARN TURBULATOR

[75] Inventors: Anthony Joseph Cesaroni, Unionville; Eldon Lawrence Fletcher, Kingston, both of Canada

[73] Assignee: DuPont Canada Inc., Mississauga, Canada

[21] Appl. No.: 09/059,582

[22] Filed: Apr. 14, 1998

Related U.S. Application Data

[60] Provisional application No. 60/044,767, Apr. 18, 1997.

[51] Int. Cl.$^7$ .............................. B29C 47/02; F28F 13/12
[52] U.S. Cl. ................................ 156/244.13; 29/890.053; 165/109.1
[58] Field of Search ................. 156/244.13, 244.22, 156/244.23, 293, 51; 264/171.13, 171.26; 425/113, 114; 165/177, 86, 96, 104.28, 109.1; 29/890.053

[56] References Cited

U.S. PATENT DOCUMENTS

| | | |
|---|---|---|
| 3,303,251 | 2/1967 | Heider et al. ...................... 264/171.13 |
| 4,395,210 | 7/1983 | Hama .......................................... 425/71 |
| 4,923,004 | 5/1990 | Fletcher et al. .......................... 165/175 |
| 5,601,775 | 2/1997 | Cunningham et al. .................. 264/469 |

FOREIGN PATENT DOCUMENTS

| | | | |
|---|---|---|---|
| 32 25 764 A1 | 7/1982 | Germany ........................... B32B 3/12 |
| 58063421 | 4/1983 | Japan .............................. B29D 23/04 |
| 1118427 | 5/1989 | Japan .............................. B29C 47/02 |

*Primary Examiner*—Michael W. Ball
*Assistant Examiner*—Barbara J. Musser
*Attorney, Agent, or Firm*—Richard H. Burgess

[57] ABSTRACT

A process and the product thereof, wherein thermoplastic tubing for use in a heat exchanger is extruded with a multifilament yarn inside to act as a turbulator. The extrusion is started with a small rod or a lead-in wire pushing the end of the yarn through the die into the tubing to a place where it adheres to the inner wall of the tubing as it is cooling, then the yarn is pulled into the tubing as it is extruded. The part of the tubing with the lead-in wire is cut off, leaving tubing with efficient turbulation.

7 Claims, 2 Drawing Sheets

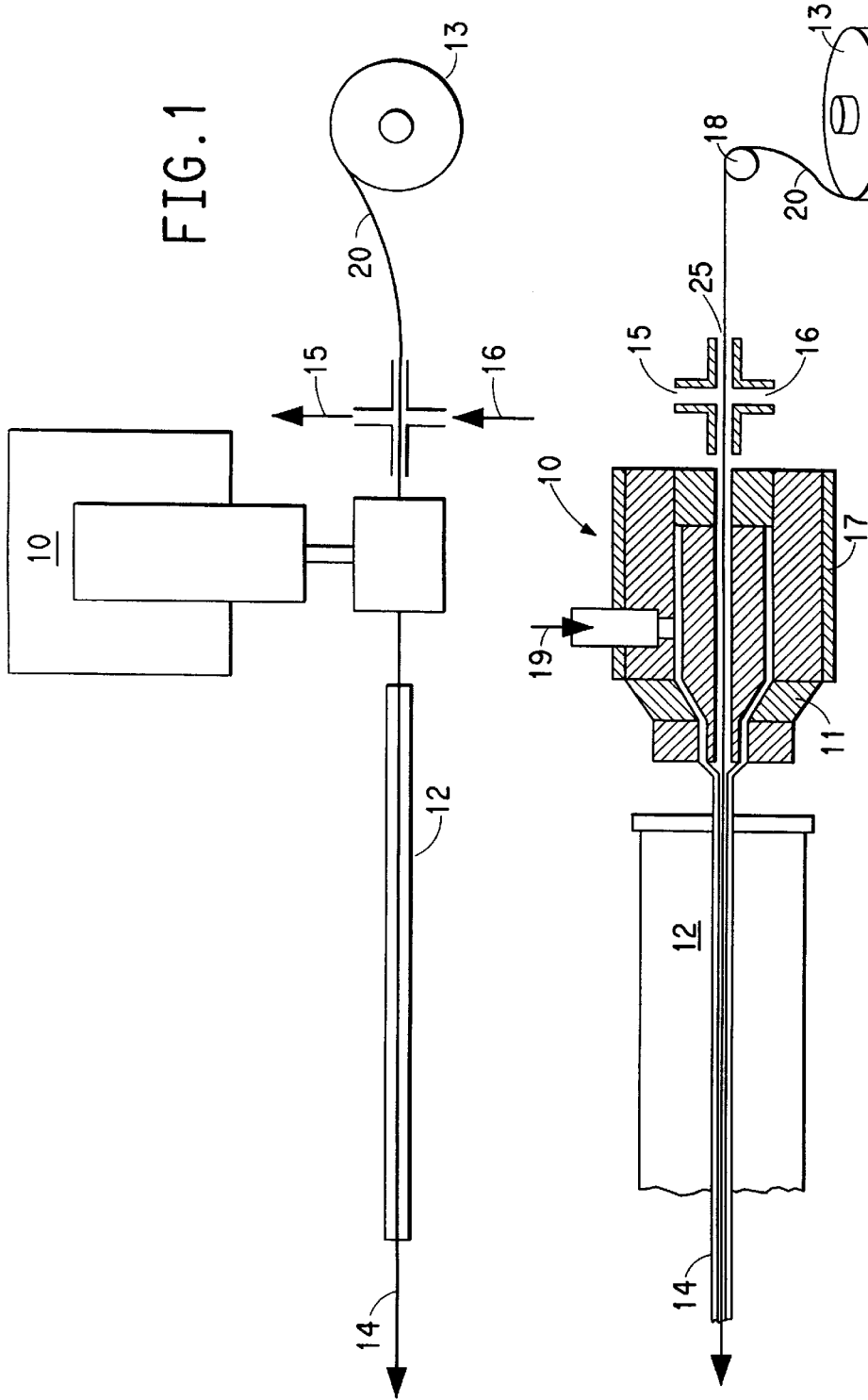

HEAT EXCHANGER TUBING WITH YARN TURBULATOR

This application claims the benefit of U.S. Provisional Patent Application Ser. No. 60/044,767 filed Apr. 18, 1997.

BACK(GROUND OF THE INVENTION

It is well known that heat transfer from a tube, particularly one carrying a viscous fluid such as an oil, can be vastly improved by the use of turbulation. By turbulation is meant that the laminar flow is interrupted so that a fresh layer of fluid is directed to the heat transfer surface of the tube. Efficiency improvements of up to 4x or more are possible. A plastic heat exchanger with built-in turbulation may be possible, and this could give a very substantial market advantage for liquid-to-air or liquid-to-liquid heat exchangers, such as oil coolers for automotive and marine applications. Providing turbulation in metal heat exchangers is difficult and costly.

The ideal turbulater is a flow inverter such as those used in polymer melt transfer lines. These devices move fluid from the centre to the outside of the tube or pipe and vice-versa. They are, however, complex to design and make, and would not be practical for small diameter thermoplastic tubing.

SUMMARY OF THE INVENTION

The present invention provides a method of producing by extrusion heat exchanger tubing containing turbulation means internal to said tubing, said method being performed using an extrusion apparatus having means for applying pressure to a thermoplastic polymer to force it through a die to form tubing, said die comprising an outer enclosure and an inner plug, with a first opening in annular shape for extruding said tubing between said enclosure and said plug, and with said plug having a second opening, and a cooling zone positioned to receive said tubing when it has exited said die, said method comprising the steps of heating said thermoplastic polymer to high enough temperatures to permit extrusion of said tubing, beginning the extrusion of said tubing, inserting through said second opening one end of a multifilament yarn made of a polymer which is capable of adhering to the polymer of said tubing, such insertion being done by attaching said yarn to one end of a linear positioning means which is stiff enough to pull said yarn through said second opening and then inserting the positioning means through said second opening and moving said positioning means far enough past the die to permit said yarn to adhere to the inner surface of the tubing, with the other end of said positioning means not yet being through the die, then continuing the extrusion of the tubing, thereby drawing through the die the other end of the positioning means and a continuous portion of said yarn which adheres to the inner surface of said tubing at enough positions along its length to resist displacement of said yarn when fluid is passed through said tubing in a heat exchanging application, and removing the portion of said tubing containing said positioning means to leave tubing suitable for use in heat exchangers with said yarn adhered inside the tubing to provide turbulation means.

The invention also includes tubing made by the process of the invention and heat exchangers made from such tubing.

BRIEF DESCRIPTION OF THE DRAWINGS

FIG. 1 is a schematic representation of the process of the invention.

FIG. 2 is an enlarged view of a portion of FIG. 1.

DETAILED DESCRIPTION OF THE PREFERRED EMBODIMENTS

Figure 3:
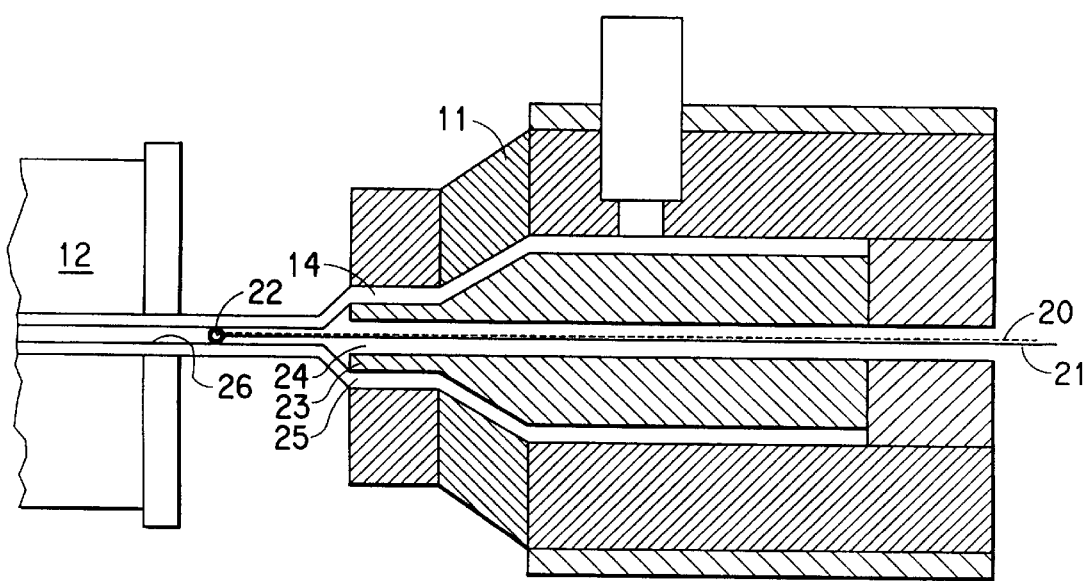
FIG. 3 is a further enlarged view illustrating the use of a wire to lead the yarn into the tubing, in accordance with the invention.

The introduction of simple spiral flow is known to result in only slight improvement. The present invention provides an effective, convenient and inexpensive solution to this problem and is applicable to especially all types of thermoplastic tubing, including nylon, or with tubes or pipes of other material, including as metal.

It has been found that a bulked continuous filament (BCF) yarn can be inserted into the inside of a tube during extrusion, and if similar materials are used, will adhere to the inside of the tube, thereby providing the desired internally turbulated tubing. Heat transfer tests on shell and tube heat exchangers constructed using this internally turbulated tubing have confirmed superior performance to heat exchangers constructed from tubes with no internal turbulation. Preferred yarns which may be employed include bulked continuous filament yarns, false twist textured yarns, air jet textured yarns and spun staple yarns, as described in standard reference texts, such as "Textile Yarns, Technology, Structure and Applications", B. C. Goswami, J. G. Martindale and F. L. Scardino, John Wiley & Sons, 1977.

FIG. 1 shows a schematic diagram of the process, which illustrates a standard tubing extrusion process. Polymer melt 19 is metered into the die 11 using an extruder 10, preferably via a meter pump, not shown. The die preferably is of the crosshead type, with internal melt distribution to the exit annulus 25 and a rear port 26 for air supply 16 to maintain dimensions of the extruded tubing.

Preferably the part of extruder 10 holding die 11 is heated by heater 17. Die 11 has an outer annulus 23 and an inner portion 23 with a hole 24 through its center where wire 21 can be passed to pull yarn 20 through die 11.

To produce tubing of this invention, a T-valve or the like is added to this port at 15 to allow direct in-line feed of yarn 20 through the port 26 while continuing to allow introduction of air. While the tubing extrusion process is operating and producing tubing of approximately the desired dimensions, yarn 20 is introduced to and fed through the rear port 26 from yarn package 13 around yarn guide 18 by means of a small diameter wire 21 (for which could be substituted a rod) with a loop 22 on its front end to hold and pull yarn 20 through die 11 until it contacts the inside of the molten tubing as it is about to enter the cooling zone, such as quench tank 12. It is desirable to feed or pull yarn 20 into tubing 14 with a small amount of tension, so that yarn 20 keeps whatever bulkiness is built into it. This enhances the opportunity for adhesion of yarn 20 to the inside surface of tubing 14. Although the preferred method of adhesion is heat, that can be substituted or enhanced by adhesive compositions or solvents. Yarn 20 receives some preheating as it passes through die 11, and the distance from die 11 to quench tank 12 is adjustable so that the parts of yarn 20 that contact inside wall 26 of tube 14 are hot enough to adhere to tube 14. Wire 21 may be released and pulled along with yarn 20 inside tube 14 and discarded. Normal production can then begin, cutting the tubing to length or coiling as required. The air flow can be regulated with the supply pressure and bleed valve 15 to maintain the proper diameter of tube 14.

As is known in the art of plastic tube extrusion, co-extruded tubing can be made use of with different polymer on the inside of the tubing than on the outside. Also, it is normal, although not illustrated here, to provide a certain amount of tension on the tubing after it exits the die to orient the tubing, causing it to neck down perhaps in the range of ratios of 2:1 to 4:1.

EXAMPLE 1

A typical crosshead die for extrusion of thermoplastic tubing was modified to permit direct in-line feed of thermoplastic yarn via the rear port normally used for supplying air to the interior of the molten tube for outer dimensional and gauge control. Air supply was continued by a separate valve incorporated into the rear assembly. Extrusion of tubing was started up as usual and controlled by air bleed into the tube. Yarn was introduced into the rear port using a wire or other extension until it adhered to the interior of the molten tube and was carried along with the extrudate, preferably with some adhesion to the interior of the tube. The tubing thus incorporating a thermoplastic yarn or internal turbulator could then be drawn, quenched and handled as with any other tubing of similar dimensions. For example, a nylon 6,6 tube with internal yarn was produced from extrusion grade nylon 6,6 of relative viscosity (RV) 240 (measured as 8.4% (by weight) solution in 90% formic acid at 25° C.) with outer diameter 0.144" (3.7 mm) and wall thickness 0.007" (0.2 mm). Yarns employed were those known in the trade as BCF of nylon 6,6 of 1280 and 2905 decitex (gm/ 10,000 m).

EXAMPLE 2

A small tube and shell heat exchanger was constructed using nylon 6,6 tubing (OD 0.144" (3.7 mm), wall 0.007" (0.2 mm)) containing internal BCF yarn (2905 decitex). An identical tube and shell heat exchanger was constructed from nylon 6,6 tubing of identical dimensions without the internal yarn. Each exchanger was comprised of 26 tubes with tube length of about 4" (102 mm). These heat exchangers were tested for their ability to transfer heat from hot oil (tube side) to cold water (shell side). Water flow, water inlet temperature and difference between water and oil inlet temperatures were maintained at constants between the two tests, and the results are given in Table 1.

TABLE 1

| | Oil Flow (kg/min) | ΔT (oil, ° C.) | Heat Transfer Rate (J/sec) |
|---|---|---|---|
| With internal yarn | 8.46 | 2.3 | 671 |
| | 6.72 | 2.8 | 634 |
| | 4.48 | 3.9 | 598 |
| | 3.14 | 4.3 | 446 |
| Without internal yarn | 8.09 | 1.3 | 365 |
| | 6.41 | 1.7 | 372 |
| | 4.95 | 2.2 | 372 |
| | 3.42 | 2.8 | 324 |

As can be seen, heat transfer is superior in each case for the heat exchanger constructed from tubing with internal yarn for comparable oil flow rates.

Thermoplastic polymers used in the invention are preferably polyamides. Among the preferred polyamides are partially aromatic melt processable polyamides or copolyamides which are polymers formed from aliphatic and aromatic monomers such as diamines, dicarboxylic acids or their derivatives, aminocarboxylic acids and lactams such that, on a molar basis, at least 25% of the monomers are aromatic in nature.

Examples of aliphatic diamines are hexamethylene diamine, 2-methyl pentamethylene diamine, 1-4 diaminobutane, 2-2-4 trimethylhexamethylene diamine, 2-2-4 trimethylpentamethylene diamine, 5-amino- 1-3-3-trimethylcyclohexane methylamine, bis-aminomethyl cyclohexane etc. Examples of aromatic diamines are m-xylene diamine, p-xylene diamine, m-phenylene diamine, and p-phenylene diamine.

Examples of aliphatic dicarboxylc acids are adipic acid, sebacic acid, dodecanedioic acid, etc. Examples of aromatic dicarboxylic acids and their derivatives are terphthalic acid, isophthalic acid, dimethyl terphthalate, and 2-6 naphthalene dicarboxylic acid.

Examples of aliphatic aminocarboxylic acids include 11-aminodecanoic acid, and 4-aminocyclohexyl acetic acid. Examples of aromatic aminocarboxylic acids include p-aminomethyl benzoic acid, 4-aminophenyl acetic acid.

Examples of aliphatic lactams are caprolactam, laurolactam, and bicyclic endoethylene caprolactam. An example of aromatic lactam is oxinadole.

These polyamides and copolyamides have high glass transition temperature such as about 65° C. or higher. There are several ways of analytically determining the glass transition temperature of polymers. One method uses dynamic mechanical analysis (DMA) of polymer samples. In the following data, the temperature at which the storage modulus in dynamic mechanical analysis (DMA) exhibits a change in slope is used to indicate the glass transition temperature.

It is desirable that the molar aromatic content of the monomers used in forming a polyamide or a copolyamide be below 65%. At higher aromatic content, the melting point of the polymer is too high to be melt processable. Also, such a polymer is likely to have low overall degree of crystallinity, and thus, will not exhibit adequate contraction upon annealing.

Table 2 lists several such partially aromatic polyamides and copolyamides along with their constituent monomers, their molar aromatic content, and approximate glass transition temperatures. Certain aliphatic polyamides are also referred for use in the invention and are listed in Table 3.

TABLE 2

| Partially Aromatic Polyamides/Copolyamides | | | |
|---|---|---|---|
| Polyamide/ Copolyamide | Monomer (molar ratio) | Glass Trans. Temp. (° C.) | Molar Aromatic Content (%) |
| 6T/DT (50/50) | HMD(50):2-MPMD(50):TPA(100) | 125 | 50 |
| 6T/DT (55/45) | HMD(55):2-MPMD(45):TPA(100) | 127 | 50 |
| 6T/DT (30/70) | HMD(30):2-MPMD(70):TPA(100) | 135 | 50 |
| 6T/66 (55/45) | HMD(100):TPA(55):AA(45) | 80 | 27.5 |
| 6T/66 (65/35) | HMD(100):TPA(65):AA(35) | 76 | 32.5 |
| 10T | DMD(100):TPA(100) | 100 | 50 |
| 12T | DDMD(100):TPA(100) | 85 | 50 |
| 6T/6 (70/30) | HMD(70):TPA(70):CAPRO(30) | 85 | 41.2 |
| 6T/DT/612 (55/10/35) | HMD(90):2-MPMD(10):TPA(65): DDDA(35) | 65 | 32.5 |

TABLE 2-continued

Partially Aromatic Polyamides/Copolyamides

| Polyamide/ Copolyamide | Monomer (molar ratio) | Glass Trans. Temp. (° C.) | Molar Aromatic Content (%) |
|---|---|---|---|
| 6T/DT/612 (50/25/25) | HMD(75):2-MPMD(25):TPA(75): DDDA(25) | 75 | 37.5 |
| 6T/DT/610 (55/10/35) | HMD(90):2-MPMD(10):TPA(65): DDDA(35) | 66 | 32.5 |
| 6T/DT/610 (50/30/20) | HMD(70):2-MPMD(30):TPA(80): AA(20) | 103 | 40 |
| 6T/6I/66 (65/25/10) | HMD(100):TPA(65):IPA(25): AA(10) | 105 | 45 |
| MXD6 | MXD(100):AA(100) | 102 | 50 |
| TMDT | TMD(100):TPA(100) | 148 | 50 |

TABLE 3

Aliphatic Polyamides

| Polyamide/ Copolyamide | Monomer (molar ratio) | Glass Trans. Temp. (° C.) | Molar Aromatic Content (%) |
|---|---|---|---|
| 66 | HMD(100):AA(100) | 48 | 0 |
| 612 | HMD(100):DDDA(100) | 45 | 0 |
| 6 | Epsilon Capro (100) | 41 | 0 |

In Tables 2 and 3, the following abbreviations have been used:
HMD Hexamethylene diamine
2-MPMD 2-Methyl pentamethylene diamine
TPA Terephthalic acid
AA Adipic Acid
DMD Decamethylene diamine
DDMD Dodecamethylene dia mine
Capro Caprolactam
DDDA Dodecanedioic acid
DDA Decanedioic acid
IPA Isophthalic acid
MXD Metaxylene diamine
TMD Trimethy hexamethylene diamine
6T polymer molecular unit formed from HMD and TPA
DT polymer molecular unit formed from 2-MPMD and TPA
66 polymer molecular unit formed from HMD and AA
10T polymer molecular unit formed from DMD and TPA
12T polymer molecular unit formed from DDMD and TPA
6 polymer molecular unit formed from Capro
612 polymer molecular unit formed from HMD and DDDA
610 polymer molecular unit formed from HMD and DDA It should be noted that the above polyamides/copolyamides may be used by themselves or in compositions with other polymers where they form the major portion of the polymeric formulation. Also, they may be modified by the incorporation of toughening agents, melt viscosity enhancers, reinforcements, fillers, and other additives to enhance their melt viscosity, processability, thermal/oxidative/chemical stability, physical properties and mechanical properties. For example, additives with reactive functional groups such as epoxy, acid or anhydride are often used to enhance melt viscosity of polyamides. Elastomeric materials with such functional groups are often used to enhance toughness properties of polyamides. Glass fibers, particulate minerals, etc. may be used to enhance stiffness and strength properties of polyamides. A common way of preparing these compositions involves melting and mixing the ingredients in appropriate proportions in an extruder, preferably a twin screw extruder.

What is claimed is:

1. A method of producing by extrusion heat exchanger tubing containing turbulation means internal to said tubing, said method being performed using an extrusion apparatus having means for applying pressure to a thermoplastic polymer to force it through a die to form tubing, said die comprising an outer enclosure and an inner plug, with a first opening in annular shape for extruding said tubing between said enclosure and said plug, and with said plug having a second opening, and a cooling zone positioned to receive said tubing when it has exited said die, said method comprising the steps of heating said thermoplastic polymer to high enough temperatures to permit extrusion of said tubing, beginning the extrusion of said tubing, inserting through said second opening one end of a multifilament yarn made of a polymer which is capable of adhering to the polymer of said tubing, such insertion being done by attaching said yarn to one end of a linear positioning means which is stiff enough to pull said yarn through said second opening and then inserting the positioning means through said second opening and moving said positioning means far enough past the die to permit said yarn to adhere to the inner surface of the tubing, with the other end of said positioning means not yet being through the die, then continuing the extrusion of the tubing, thereby drawing through the die the other end of the positioning means and a continuous portion of said yarn which adheres to the inner surface intermittently of said tubing at enough positions along its length to resist displacement of said yarn when fluid is passed through said tubing in a heat exchanging application, and removing the portion of said tubing containing said positioning means to leave tubing suitable for use in heat exchangers with said yarn adhered inside the tubing to provide turbulation means.

2. The method of claim 1 wherein the positioning means pulls said yarn into said tubing into the area surrounded by said cooling zone.

3. The method of claim 1 wherein said positioning means is in the form of a wire.

4. The method of claim 1 wherein the thermoplastic polymer of the tubing is a polyamide.

5. The method of claim 4 wherein the polymer of said yarn is a polyamide.

6. The method of claim 5 wherein said yarn is adhered to said tubing by means of heat.

7. The method of claim 1 wherein the yarn is bulked continuous filament yarn.

* * * * *